United States Patent [19]

Agostini et al.

[11] Patent Number: 4,833,552

[45] Date of Patent: * May 23, 1989

[54] TOP LOADING RECORD CHANGER MECHANISM WITH REMOVABLE MAGAZINE SUPPORTED FOR SWIVELING BETWEEN A TOP LOADING POSITION AND AN OPERATING POSITION ANGULARLY DISPLACED THEREFROM

[75] Inventors: Louis P. C. Agostini; Philippe V. Denis, both of Brussels, Belgium

[73] Assignee: Staar, S.A., Belgium

[ * ] Notice: The portion of the term of this patent subsequent to Oct. 20, 2004 has been disclaimed.

[21] Appl. No.: 35,881

[22] Filed: Apr. 8, 1987

[30] Foreign Application Priority Data

Apr. 25, 1986 [BE] Belgium ................................ 216592

[51] Int. Cl.⁴ ........................ G11B 15/68; G11B 17/08
[52] U.S. Cl. .................................. 360/92; 360/98.06; 369/191; 369/192
[58] Field of Search ...................... 360/98, 92; 369/34, 369/191, 192, 36; 414/281, 280

[56] References Cited

U.S. PATENT DOCUMENTS

| 4,363,044 | 12/1982 | Castrodale et al. | 360/98 |
| 4,504,878 | 3/1985 | Gutmann | 360/98 |
| 4,701,899 | 10/1987 | d'Alayer de Costemor d'Arc | 369/36 |

FOREIGN PATENT DOCUMENTS 61-196461  8/1986  Japan ................................... 360/92

*Primary Examiner*—Robert S. Tupper
*Attorney, Agent, or Firm*—Leydig, Voit & Mayer

[57] ABSTRACT

A record changer apparatus having a removable magazine for storing a plurality of records, a playback-/recording mechanism for receiving and playing or recording a record transferred from the magazine, a housing mounted adjacent the playback/recording mechanism and adapted to receive the removable magazine, the housing being mounted for swiveling about a mounting axis between an operating position in which the magazine in the housing is located to allow transfer of a selected record between the mechanism and the magazine and a loading position angularly displaced from the operating position in which the magazine may be removed or loaded into the housing. The housing and magazine are swiveled between operating and loading positions either manually or by power.

21 Claims, 5 Drawing Sheets

TOP LOADING RECORD CHANGER MECHANISM WITH REMOVABLE MAGAZINE SUPPORTED FOR SWIVELING BETWEEN A TOP LOADING POSITION AND AN OPERATING POSITION ANGULARLY DISPLACED THEREFROM

TECHNICAL FIELD

The present invention relates to changers for records such as discs and cassettes and, more particularly, to changers for discs and cassettes which are carried in a removable magazine.

BACKGROUND ART

Generally, a record changer apparatus is associated with a mechanism for performing the playback and/or the recording of magnetic tape cassettes or discs which is mounted in a horizontal or near horizontal position since it is then less sensitive to balance problems of the relatively high speed rotating masses (compact discs: 500 rpm, tape recorders flywheel: 300 rpm) and to external vibrations such as are encountered when such apparatus is installed in vehicles. Horizontal lay-out of the playback/recording mechanism normally results in the magazine having the same arrangement and hence involving a horizontal translation for its removal and insertion to load and unload.

While such horizontal lay-out is acceptable for record changers and playback/recording mechanisms intended for "home" use and a "front" loading apparatus in which the magazine is horizontally arranged as is disclosed in commonly assigned, copending application Ser. No. 9.00,890, now U.S. Pat. No. 4,701,899 horizontal lay-out is not always satisfactory for record changer apparatus intended for automobile vehicle mounting or for industrial or professional use.

For those intended uses, loading from the top of the apparatus would be desirable. However, top loading is not compatible with a horizontally positioned magazine, unless implemented by exceedingly bulky and cumbersome means to swivel the whole changer.

DISCLOSURE OF THE INVENTION

The principal object of the present invention is to overcome these drawbacks through a simple, reliable mechanism which permits the "removable" magazine of a horizontal type changer to be loaded and unloaded either horizontally or vertically and thus allows front or top loading.

Another object of the invention is to ensure the automatic transfer of the magazine from its horizontal position to its vertical position and vice-versa when the changer is brought from the operating position to the loading or unloading position of the magazine.

An important object of the invention is to provide an apparatus which permits front or top loading, and automatic magazine positioning, without increasing the apparatus dimensions and thus permitting the use of such apparatus in locations where available space is limited, such as in the front passenger compartment of an automotive vehicle.

Further objects and advantages of the invention will be apparent from the following description, taken with reference to the drawings, in which.

DESCRIPTION OF PREFERRED EMBODIMENTS

Figure 1:
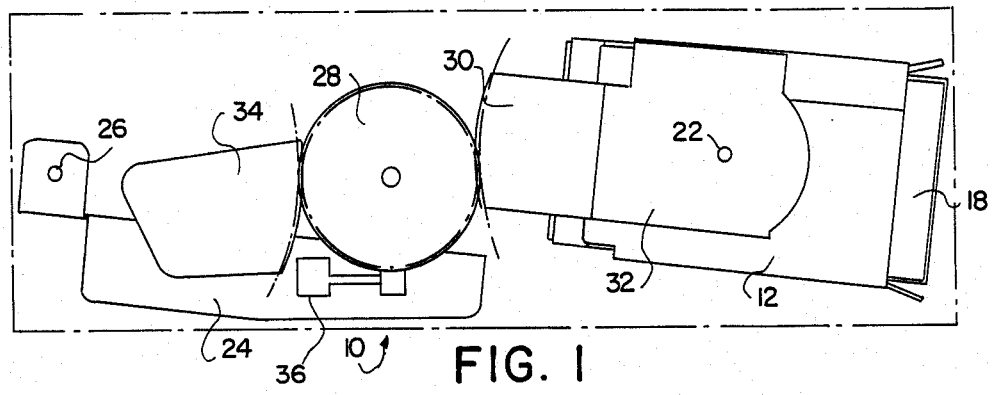
FIG. 1 is a side view of a first embodiment of a changer apparatus constructed according to the invention and shows a pivotally mounted housing which receives the record magazine, located in a horizontal operating position.
Figure 2:
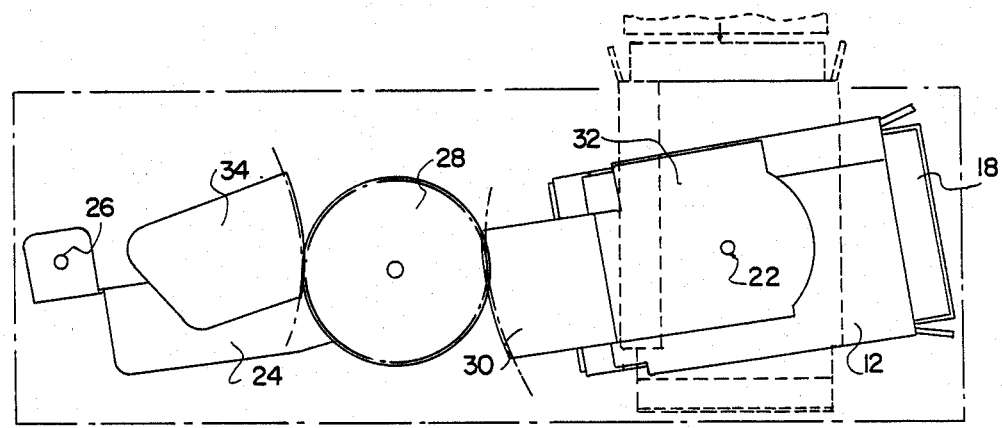
FIG. 2 is a view similar to FIG. 1 showing the pivotally mounted housing swiveled to a vertical top loading position.

Turning to FIGS. 1-6, in a first embodiment, the invention is incorporated in a "compact discs" record changer apparatus having a playback/recording mechanism of the same basic construction described in commonly assigned, co-pending application Ser. No. 900,890, entitled "Swinging Changer", which is incorporated herein by reference.

The apparatus 10 comprises a housing 12 mounted on the main "U" shaped frame 14 (see FIG. 5) having an open end 16 for receiving a removable magazine 18 for storing records R such as compact discs or cassettes. The housing 12 is mounted by means of bearing assemblies 20 to swivel about a horizontal axis 22 between a substantially horizontal operating, portion (FIG. 3) and a vertical loading position (FIG. 4), and adjacent the housing 12 is a playback/recording mechanism 24 of the information stored in the records R contained in the magazine 18. Included within the playback/recording mechanism 24, and not shown in detail, is a transfer device for transferring a record R to and from the magazine 18 when the playback/recording mechanism is operating with the housing 12 and magazine 18 in the horizontal operating position. For further details of a suitable transfer mechanism, reference may be made to the co-pending application previously referred to.

In this embodiment of the invention, although the invention is not limited thereto, the playback/recording mechanism 24 is also mounted for pivotal movement about an axis 26 which is parallel with the mounting axis 22 for the housing 12 and magazine 18 and the playback/recording mechanism 24 and the housing 12 and magazine 18 are coupled and operated to produce coordinated opposite angular displacements thereof about their respective axes 22, 26 between different fixed positions in each of which the playback/recording mechanism 24 is aligned with a different record R in the magazine 18 to allow transfer of the selected record therebetween by the transfer mechanism. One advantageous drive means for producing such coordinated movement includes a drive gear 28 in engagement with a toothed sector 30 mounted on a plate 32 connected to the housing 12 and also in engagement with a toothed segment 34 mounted on the playback/recording mechanism 24. A drive motor 36 connected to the drive gear 28 is operated to shift the magazine 18 and the playback/recording mechanism 24 about their respective axes 22, 26 between the different fixed positions in each of which the playback/recording mechanism 24 is aligned with a different record R in the magazine 18.

The plate 32 is mounted to swivel about the mounting axis 22 of the housing 12 and is guided and limited in its swiveling movement by two pins 38, 40 (FIG. 3) carried by the plate 32 and associated with slots 39, 41 cut in the adjoining frame side panels of the apparatus case 44. The drive motor 36 by means of intermediate gears operates the drive gear 28 which is in engagement with the toothed sectors 34, 30 on the playback/recording mechanism 24 and on the plate 32. The rotation of the drive gear 28 positions the playback/recording mechanism 24 and the housing 12 (and the magazine 18), relative to each other.

In keeping with the invention, means is provided for coupling the housing 12 and the playback/recording mechanism 24, shown in this embodiment as a coupling spring 46 resiliently holding the housing 12 in an operating position with respect to the plate 32 such that these components are integral and any angular movement of the plate 32 by the drive gear 28 results in an identical angular movement of the housing 12 and hence of the magazine 18. Thus, to the extent ensured by the resilient coupling, when mounted in the horizontal operating position, the magazine 18 and the playback/recording mechanism 24 have coordinated opposite angular displacements between different fixed positions in each of which the playback/recording mechanism 24 is aligned with a different compartment 48 (FIG. 4) in the magazine 18, to allow transfer of a record R in the compartment 48 between the magazine 18 and the playback/recording mechanism 24.

To hold the removable magazine 18 in a fixed position within the housing 12, a lever 50 is provided which is mounted to pivot around a shaft 52 and is urged in a counterclockwise direction by a latch spring 54. The lever 50 has a claw end 56 adjacent the open end 16 of the housing 12 such that in the locking position of the lever 50 and the claw end 56 (illustrated in FIG. 3), the magazine 18 is locked in the housing 12 when it is in the operating position.

Figure 3:
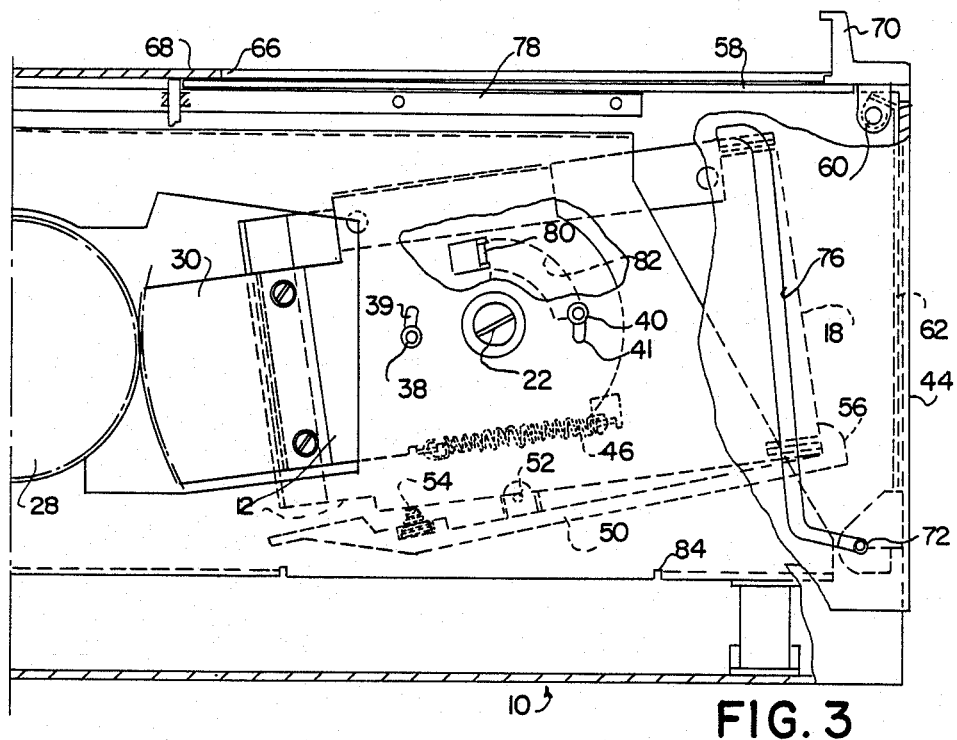
FIG. 3 is a partial detailed side view of the apparatus with the housing at the horizontal position.
Figure 4:
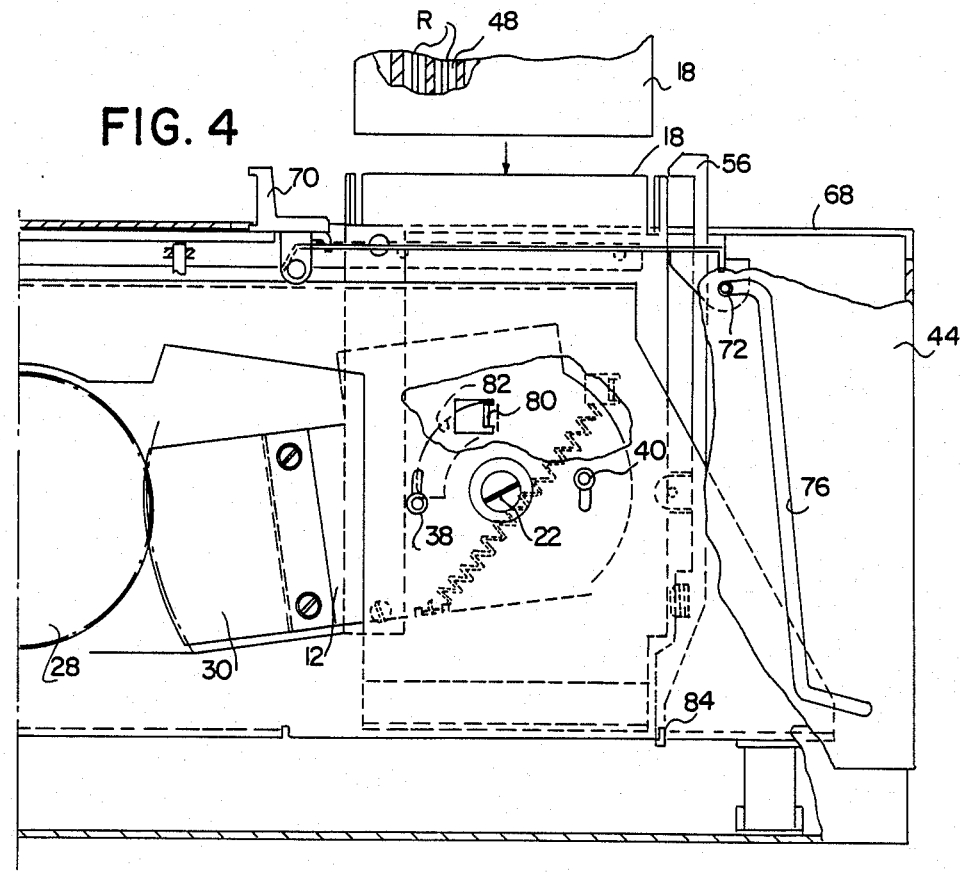
FIG. 4 is a view similar to FIG. 3, the housing having been swiveled to the top loading position.
Figure 5:
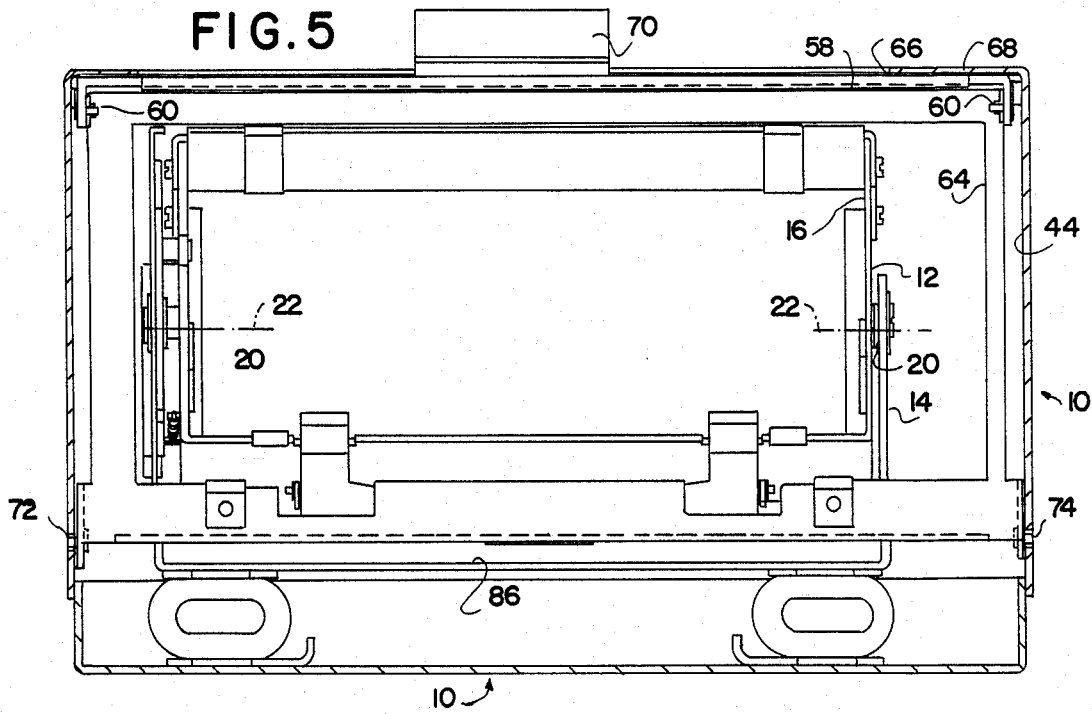
FIG. 5 represents a front view of the apparatus of FIGS. 1-4.

A sliding cover 58 is fastened by a hinge 60 to an actuator plate 62 having a large rectangular opening 64, visible in FIG. 5 which is a front view of the apparatus looking through the large rectangular opening 64 in the actuator plate 62 to the interior of the housing 12 which is pictured, in this view, with the magazine having been removed. In this position of the cover 58, it blocks a top opening 66 in the top 68 of the case 44 of the apparatus through which access is provided to the housing 12 when it is in the vertical loading position. A handle 70 projects above the top 68 of the case 44 and is fastened to the cover 58 and the actuator plate 62 at the hinge 60. Referring to FIGS. 3 and 5, which depict the housing 12 in the substantially horizontal position (the operating position when a magazine 18 is present in the housing 12), it can be seen that the actuator plate 62 which is guided in an essentially vertical path from the position of FIG. 3 to the position of FIG. 4 and then pivots into a horizontal plane in which the large rectangular opening 64 in the actuator plate 62 is in register with the opening 66 in the top 68 of the case 44 of the apparatus 10. Thus, a magazine 18 may be inserted through the opening 66 in the top 68 of the case 44 and through the rectangular opening 64 in the actuator plate 62 into the open end 16 of the housing 12 and may be removed through the same registered openings. The sliding movement of the actuator plate 62 is guided by two pins 72, 74 (FIG. 5) passing through two symmetrical "Z" shaped 76 slots in the side panels of the case 44. The slots are "Z" shaped to produce the requisite vertical and swinging movement from the vertical to the horizontal plane of the actuator plate 62. At the same time, the cover 58, which is blocking the opening 66 in the top 68 of the case 44 when the housing 12 is in the horizontal operating position, slides horizontally to a position clear of the opening 66. The guiding of the horizontal movement of the cover 58 is accomplished with two sliders 78 riveted on each side panel of the case 44.

On movement of the cover 58 using the handle 70, in this embodiment of the invention wherein the swiveling of the housing 12 is accomplished manually, the lower elements of the actuator plate 62 in the position of FIGS. 3 and 5 are guided through the lower portions of the "Z" shaped slots 76 into engagement with the lower side of the housing 12 adjacent the open end 16 such that continued vertical and then swinging movement of the actuator plate 62 causes the housing 12 to pivot counterclockwise from the position shown in FIG. 3 to the position shown in FIG. 4. The elements of the plate 62 at the lower end of the "Z" shaped slots 76 in FIG. 3 have moved to the upper ends of the slots 76 in FIG. 4 and remain engaged with the side of the housing 12 adjacent the open end 16. Thus, first the actuator plate 62 comes in contact with the side of the housing 12 adjacent the open end 16 as it is guided in its movement by the lower portion of the "Z" shaped slots 76, and causes the housing 12 to swivel about its mounting axis 22, the swiveling movement being guided by a projection 80 extending inwardly from the mounting plate 32 (as shown in FIGS. 3 and 5) and into a circular arc shaped slot 82 extending about 90° in the adjoining side wall of the housing 12. As the housing 12 swivels, the coupling spring 46 is stretched between the plate 32 and the housing 12, this spring 46 providing a resilient connection to allow the swiveling movement. As the housing 12 swivels, in response to the movement of the actuator plate 62, the claw end 56 of the locking lever 50 which holds the magazine 18 within the housing 12 abuts against a fixed stop 84 (see FIG. 4) in the bottom wall 86 of the "U" shaped frame 14, which causes the lever 50 to swivel against the latch spring 54 and causes the claw end 56 of the lever 50 to move outwardly away from the open end 16 of the housing 12. A magazine 18 may then be withdrawn or inserted into the open end 16 of the housing 12, as indicated in FIG. 4.

Figure 7:
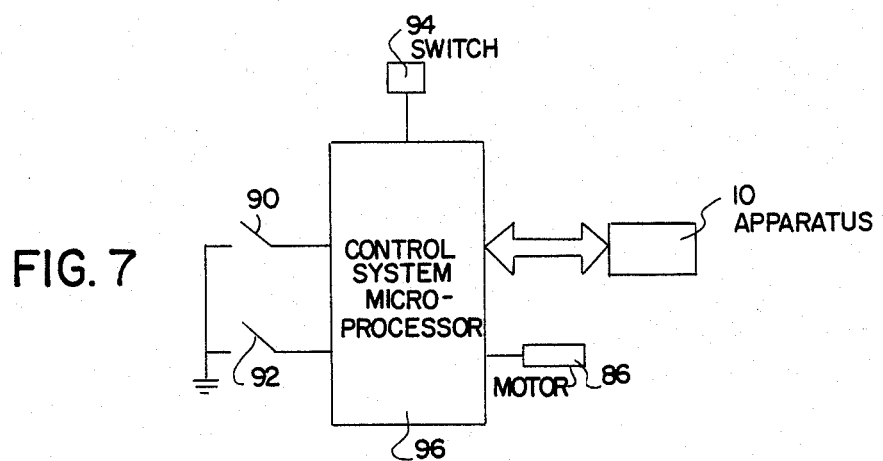
FIG. 7 is a diagram of a control system for the apparatus of this invention.
Figure 6:
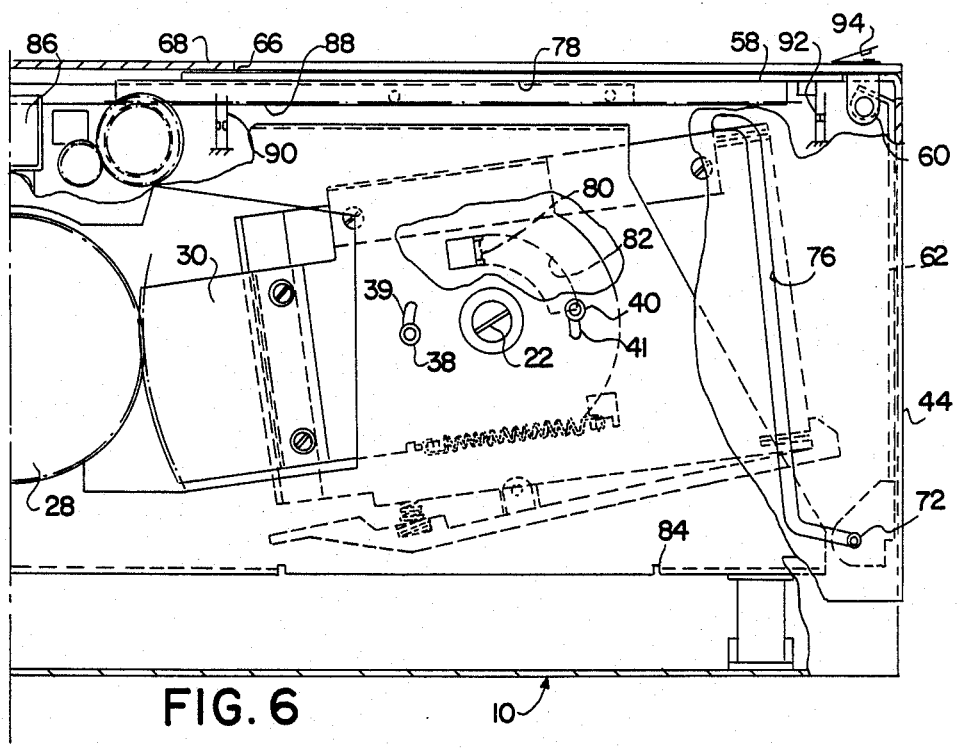
FIG. 6 is a view similar to FIG. 3, and illustrates additional mechanism.

Referring to FIG. 6, while in FIG. 5 the cover 58 and actuator plate 62 are moved manually, power operated means including a micro-motor 86 and gears driving a toothed rack 88 connected to the cover 58 may be employed to move the cover 58, actuator plate 62, and housing 12 under power. Limit switches 90, 92 (see FIG. 7) switch off the supply from a power source to the micro-motor 86 when the cover 58 has reached its open and closed positions.

To open the cover 58, an operator actuates a switch 94 located on top of the case 44 of the apparatus 10 which is connected to a control microprocessor 96, which is operated under program control to carry out the opening and closing sequences. Upon actuation of the switch 94, the microprocessor 96 controls the motors and drives of the playback/recording mechanism 24 and transfer mechanism to return into the magazine 18 a disc present in the playback/recording mechanism 24, then actuates the micro-motor 86 for driving the cover 58 and housing 12 which causes the translation of the cover 58 and actuator plate 62, and swiveling of the housing 12 from the operating to the loading position. The supply o the motor 86 is maintained until the limit switch 90 is actuated; similarly, when closing the cover 58, the actuation of a second limit switch 92 switches off the power supply to the motor 86.

Figure 8:
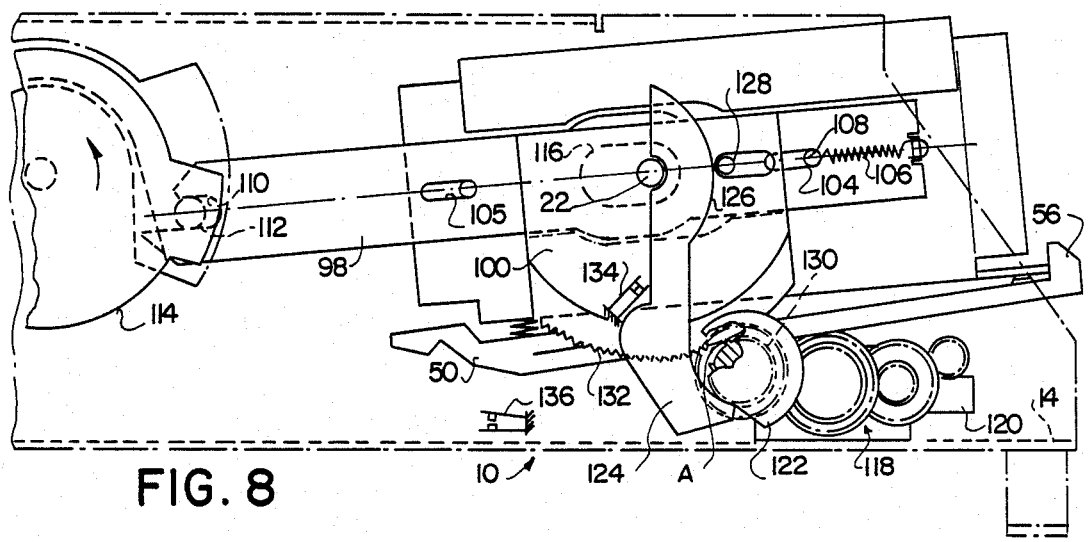
FIG. 8 is a fragmentary side view of an alternative embodiment of a record changer apparatus according to the invention.
Figure 9:
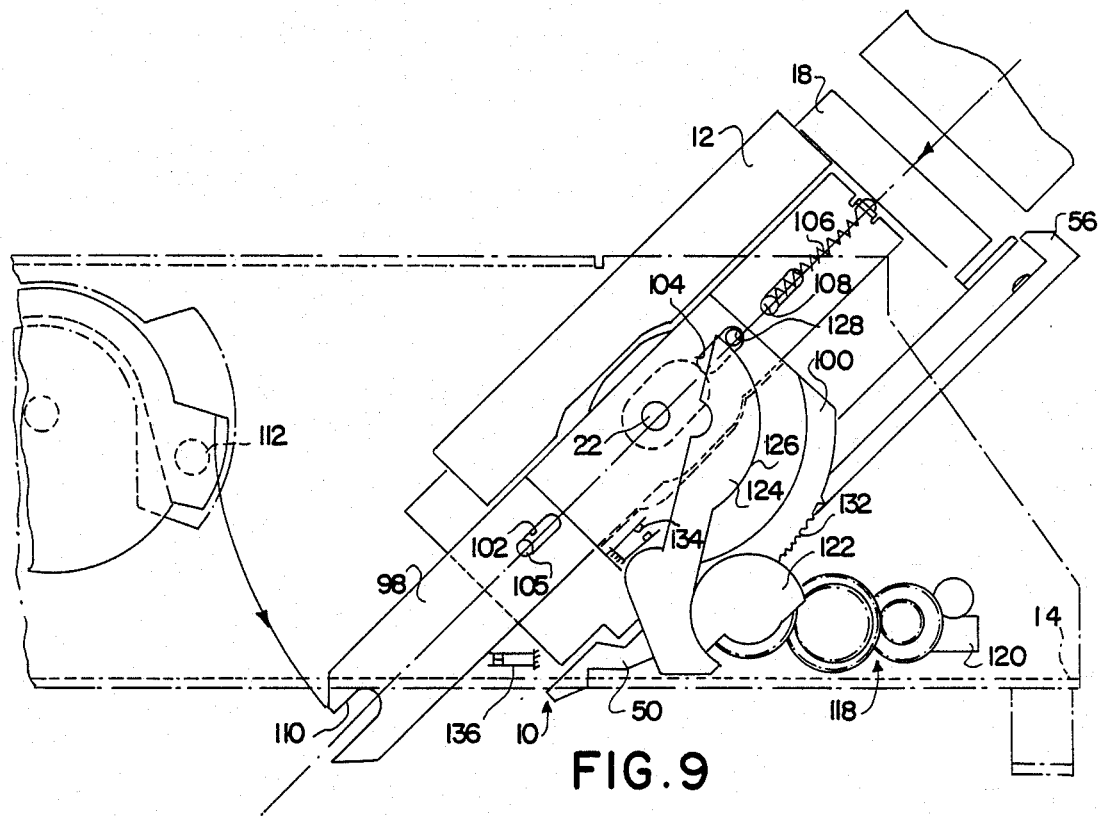
FIG. 9 is a view similar to FIG. 8 of the alternative embodiment, with the housing which receives the record magazine swiveled to a position angularly displaced from the horizontal position in which it is shown in FIG. 8.
Figure 10:
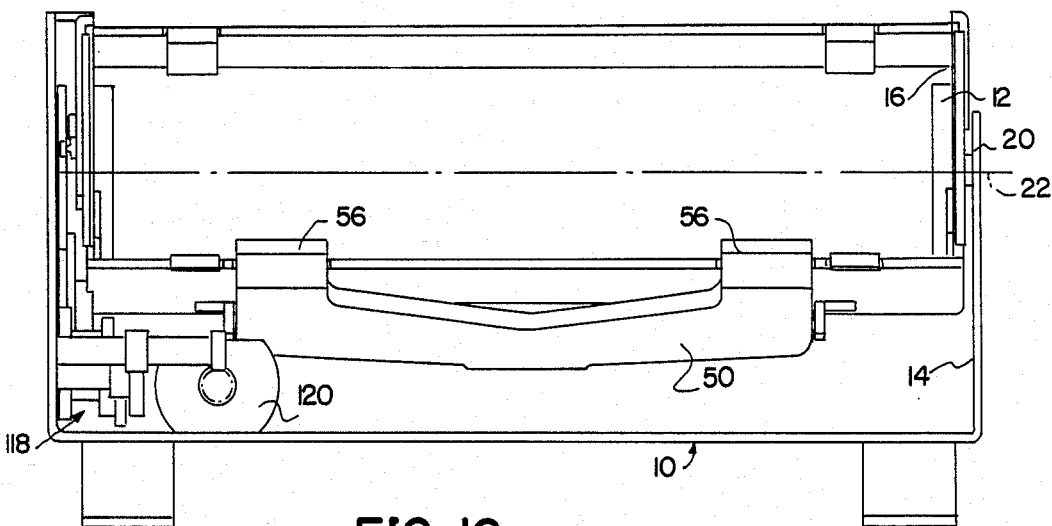
FIG. 10 is a front view of the apparatus of FIGS. 8 and 9.

Turning now to FIGS. 8-10, an alternative, most preferred, embodiment of the invention is illustrated. According to the invention, in this embodiment the housing 12, and hence magazine 18, is coupled to the playback/recording mechanism 24 by a rigid coupling whereas, in the embodiment of the invention of FIGS. 1-6, the coupling includes a spring 46 which allows relative movement since the connection is not rigid but resilient. A rigid coupling avoids any problems that may occur with a resilient connection under conditions such as strong vibration, which may interfere with rapid, precise, relative positioning of the playback/recording mechanism 24 and magazine 18.

As shown in FIGS. 8-10, this embodiment has been shown without certain other parts of the apparatus illustrated in FIGS. 1-6, for purposes of simplifying the description, such as details of the resilient support for the frame 14, the surrounding case 44, and the movable cover 58. It is to be understood that the components shown in FIGS. 8-10 are intended to be used in a case with a movable cover such as is shown in FIGS. 1-6.

As shown in FIGS. 8 and 10, the open ended housing 12 is supported on the U-shaped main frame 14 which, in turn, is mounted on resilient supporting members. The housing 12 is supported on side elements of the frame 14 via bearing assemblies 20 which allow the housing 12 to swivel about the mounting axis 22 between a horizontal operating position and a loading position, angularly displaced from the operating position. The preferred loading position is vertical as shown in FIG. 4, but other loading positions such as a 45° position as shown in FIG. 9 may be used to suit given installations. The magazine 18 is held within the housing 12 by a catch or claw end 56 on the end of the lever 50, similar to the arrangement illustrated in connection with FIGS. 1-6.

In the operating position of FIG. 8, a rigid coupling means between the playback/recording mechanism 24 and the housing 12, and hence the magazine 18, is provided by an elongated slider member 98 which is mounted for endwise sliding movement between the lateral side of the housing 12 and a plate 100 carried by said housing 12. The slider member 98 has a pair of openings 102, 104 cooperating with studs 105, 108 mounted on the housing 12 for guiding the translation of the slider member 98, and the slider member 98 is urged to the left as shown in FIG. 13 by a spring 106 attached at one extremity to the slider member 98 and at its other extremity to the stud 108. The spring 106 urges the slider member 98 endwise such that a notch 110 in the projecting end of the slider member 98 receives a stud 112 mounted on a wheel component 114 connected to the playback/recording mechanism 24. A central opening 116 in the slider member 98 provides clearance for the bearing assembly 20 on the mounting axis 22 of the housing 12 and allows the housing 12 and slider member 98 to swivel, as shown in FIGS. 8 and 9 . In the operating position of FIG. 8, with the magazine 18 held within the housing 12, the playback/recording mechanism 24 and magazine 18 are rigidly coupled for coordinated opposite angular displacements about their respective axes 22, 26 between different fixed positions in each of which the playback/recording mechanism 24 is aligned with a different record R in the magazine 18. The magazine 18 preferably has different compartments 48 to store a plurality of records R. The transfer mechanism is provided to allow transfer of a selected record R between the playback/recording mechanism 12 and the magazine 18 when the mechanism and magazine are located at one of the fixed positions. When the coupling means is disengaged, the housing 12 and magazine 18 are swiveled angularly independent of the playback/recording mechanism 24, to a loading position angularly displaced from the operating position shown in FIG. 13.

For this purpose, to swivel the housing 12, in place of using the actuator plate 62 of FIGS. 1-6, a cam drive is provided driven through gears 118 from a micro-motor 120 mounted on the frame 14. The cam drive includes a cam 122 driving a lever 124 having an arcuate profile 126 engaging a stud 128 mounted on the slider member 98 to translate the slider member 98 as the lever 124 is pivoted clockwise from the position shown in FIG. 8. Such pivotal movement of the lever 124 causes the arcuate profile 126 thereof to engage the stud 128 on the slider member 98 and shifts the slider member to the right (FIG. 8), thus disengaging the notch 110 in the projecting end of the slider member 98 from the stud 112 on the playback/recording mechanism 24 (see FIG. 9 ), and decoupling the housing 12 and magazine 18 from the playback/recording mechanism 24. The housing 12 and magazine 18 then swivel independently of the playback/recording mechanism 24, due to a drive gear 130 engaging a toothed segment 132 on the plate 100. As indicated by arrow A in FIG. 8, on both the drive gear 130 and the toothed segment, some teeth are missing so that the drive mechanism to swivel the housing 12 and the magazine 18 does not interfere with the coordinated pivotal movement of the playback/recording mechanism 24 and the magazine 18 during disc selection. Two limit switches 134, 136 are positioned to detect the angular position of the lever 124 and the slider member 98, respectively.

In operating this embodiment of the invention, when the sliding cover 58 is opened, it actuates a sensing switch 90 which provides a signal to the microprocessor 96 of the control system. The microprocessor under program control causes power to be supplied to the micro motor 86. Through the reduction gear assembly, both the gears 118 and the cam 122 are rotated and, simultaneously, the lever 124 is pivoted clockwise to drive the slider member 98 backwards and unclutch the notch 110 in its extremity from the stud 114 of the playback/recording mechanism 24, and the drive gear 130 and toothed segment 132 come in meshing connection so as to pivot the housing 12 and magazine 18 counter-clockwise, to a loading position. When the housing has been pivoted about 45°, the magazine locking lever 50 abuts against the wall of an opening in the frame 14 so that any further pivoting of the housing 12 forces the lever 50 to pivot against the action of the latch spring 54 so as to disengage the claw end or catch 56 from the magazine 18 and allow removal of the magazine. A desired ultimate loading position is sensed by a switch which indicates to the microprocessor 96 the completion of the swiveling movement. A switch may also be employed in the housing 12 to sense the presence or absence of the magazine holder.

We claim:

1. A record changer apparatus comprising:
   a removable magazine for storing a plurality of records,
   a playback/recording mechanism for receiving and playing or recording a record transferred from said magazine,
   a housing mounted adjacent said playback/recording mechanism and adapted to receive said removable magazine,
   means for mounting said housing for swiveling about a mounting axis between an operating position of said housing in which said magazine is located to allow transfer of a selected record between said mechanism and said magazine and a loading position angularly displaced from the operating position in which said magazine may be removed or loaded into said housing,
   power operated means connected to said housing for swiveling said housing between the operating and loading positions, and
   means for transferring a selected record between said magazine and said mechanism when said housing is in the operating position.

2. A record changer apparatus according to claim 1 including means for mounting said playback/recording mechanism for pivoting about an axis parallel to the mounting axis of said housing, and means for coupling said housing and said playback/recording mechanism to provide, when coupled, coordinated opposite angular displacements thereof about their respective axes, and to allow, when uncoupled, angular displacements of said housing independent of said mechanism between the operating and the loading positions.

3. A record changer apparatus according to claim 1 including coupling means having a member extending from said housing and shiftable from a position engaged with said playback/recording mechanism to couple said housing thereto to a position disengaged from said playback/recording mechanism to allow angular displacements of said housing independent of said mechanism.

4. A record changer apparatus according to claim 1, said magazine having a plurality of compartments for storing records, and means for moving said magazine relative to said playback/recording mechanism between different fixed positions in each of which said playback/recording mechanism is aligned with a different compartment to allow transfer of a record between the compartment and the playback/recording mechanism.

5. A record changer apparatus according to claim 1, said magazine having a plurality of compartments for storing records, and means for pivotally supporting said playback/recording mechanism and for moving said mechanism and magazine in opposite directions between different fixed positions in each of which said playback/recording mechanism is aligned with a different compartment to allow transfer of a record between the compartment and the playback/recording mechanism.

6. A record changer apparatus according to claim 1, said magazine having a plurality of compartments for storing records, said apparatus including an open-ended housing into which said magazine may be loaded or removed, said housing being movable angularly to transfer a magazine between a substantially horizontal operating position and a substantially vertical top loading position.

7. A record changer apparatus according to claim 1, said magazine having a plurality of compartments for storing records, said apparatus including an open-ended housing into which said magazine may be loaded or removed, said housing being angularly displaceable to transfer a magazine from a substantially horizontal operating position to a top loading position angularly displaced from the horizontal operating position.

8. A record changer apparatus comprising:
   a removable magazine for storing a plurality of records,
   a playback/recording mechanism for receiving and playing or recording a record transferred from said magazine,
   a housing mounted adjacent said playback/recording mechanism and adapted to receive said removable magazine,
   means for mounting said housing for swiveling about a mounting axis between an operating position of said housing in which said magazine is located to allow transfer of a selected record between said mechanism and said magazine and a loading position angularly displaced from the operating position in which said magazine may be removed or loaded into said housing,
   means connected to said housing for swiveling said housing between the operating and loading positions,
   coupling means between said housing and said playback/recording mechanism allowing angular displacements of said housing between the operating and loading positions independent of said mechanism, and
   means for transferring a selected record between said magazine and said mechanism when said housing is in the operating position.

9. A record changer apparatus according to claim 8, said coupling means including a resilient connection holding said housing in alignment with said mechanism in the operating position, and allowing said housing to swivel to the loading position.

10. A record changer apparatus according to claim 8, said coupling means including a rigid connection holding said housing in alignment with said mechanism in the operating position, and disengageable from said mechanism to allow said housing to swivel to the loading position.

11. A record changer apparatus according to claim 8 including means for latching said magazine in said housing while in the operating position and for releasing said latching means a said housing swivels to the loading position.

12. A record changer apparatus according to claim 8 including a case having a top wall with an access opening for loading a magazine into said housing, and a cover movable coincident with transfer of said housing from a horizontal operating position to a vertical loading position to shift from a position blocking the access opening to a position clear of the access opening to allow loading of a magazine through the access opening into the magazine.

13. A record changer apparatus according to claim 8 including a manually operated actuating plate for transferring said housing between the operating and loading positions.

14. A record changer apparatus according to claim 8 including a power operated member for transferring said housing between the operating and loading positions.

15. A record changer apparatus according to claim 12 including an actuating plate hinged to said cover and engageable with said housing to transfer said housing between the operating and loading positions.

16. A record changer apparatus according to claim 10, said coupling means including a slider member movable to project into engagement with a member operatively connected to said playback/recording mechanism, to provide a rigid connection holding said housing in alignment with said mechanism, and to retract from the member to disengage said coupling means.

17. A record changer apparatus according to claim 16 including cam drive means for projecting and retracting said slider member to engage and disengage said coupling means.

18. A record changer apparatus according to claim 17 including a drive motor connected to said cam drive means, and a gear drive also operated by said drive motor, to engage and disengage said coupling means and to swivel said housing between the operating and loading positions under power.

19. A record changer apparatus according to claim 12 including limit switch means operative upon movement of said cover to the position blocking the access opening.

20. A record changer apparatus according to claim 12 including limit switch means operative upon movement of said cover to the position clear of the access opening.

21. A record changer apparatus according to claim 17 including limit switch means operated, respectively, by said slider member and cam drive means to represent rejected and retracted positions of said coupling means.

* * * * *